United States Patent Office 3,759,888
Patented Sept. 18, 1973

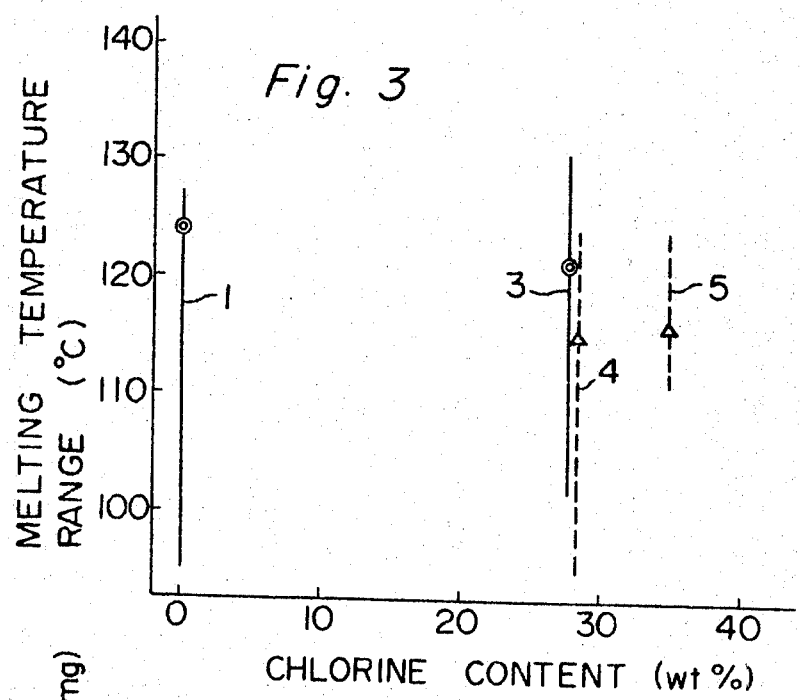
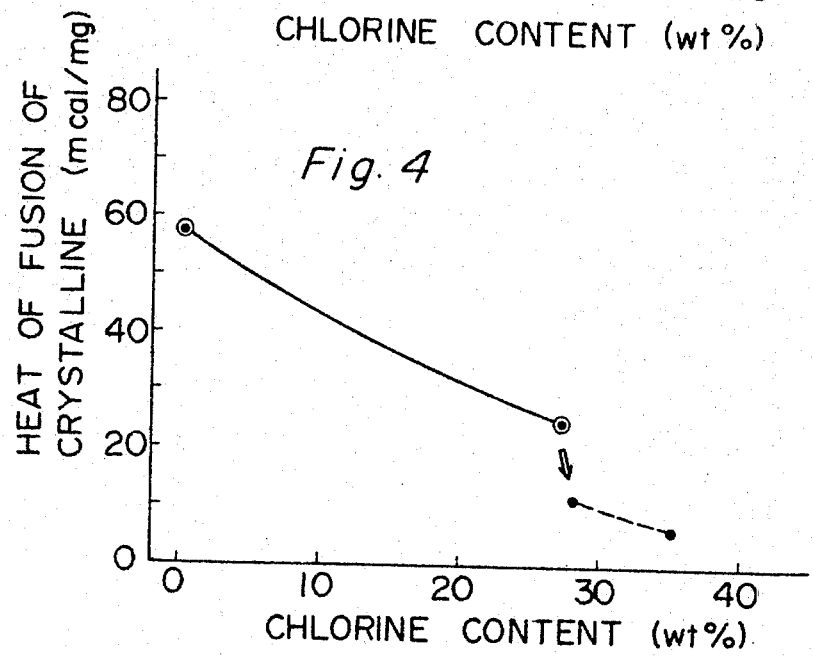

3,759,888
PROCESS FOR THE PREPARATION OF CHLORINATED POLYETHYLENE, AND COMPOSITIONS THEREOF
Shinji Nose, Amagasaki, Hideaki Tsujimura, Ikeda, Katumi Iio, Ibaraki, Hitoshi Ishihara, Amagasaki, and Hiroshi Yoshimoto, Ibaraki, Japan, assignors to Osaka Soda Co., Ltd., Osaka, Japan
Filed Nov. 10, 1970, Ser. No. 88,339
Int. Cl. C08f 29/04
U.S. Cl. 260—94.9 H                  8 Claims

ABSTRACT OF THE DISCLOSURE

An improved process of making chlorinated polyethylenes, which comprises the steps of:
  (a) first stage chlorination of polyethylene powder, under introduction of chlorine, at a temperature not exceeding the upper critical melting temperature (T) or the fluctuated upper critical melting temperature ($T_a$) of crystalline portion of the polyethylene,
  (b) heat-treatment of the first-stage-chlorinated polyethylene at a temperature ($T_b$) exceeding the lower critical melting temperature of crystalline portion of said chlorinated polyethylene and the temperature at which the first stage chlorination is performed, following the interruption of chlorine introduction, and
  (c) further chlorination of the heat-treated, chlorinated polyethylene until the desired chlorine content is obtained, under resumption of chlorine introduction at a temperature ($T_c$) below the above temperature ($T_b$).

---

Figure 1:
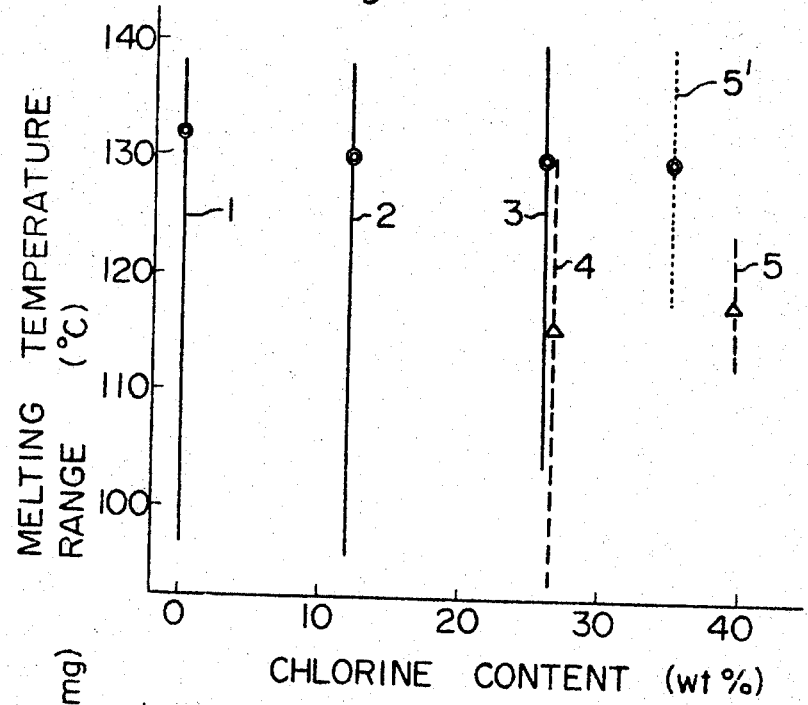

This invention relates to an improved process of making chlorinated polyethylenes which show improved performance in some or all of the properties such as solvent resistance, tensile strength, impact resistance, transmittance, elongation at breaking point, 100% modulus, and hardness, compared with conventionally prepared chlorinated polyethylenes of equivalent chlorine contents, with good qualitative reproducibility and operational as well as equipmental advantages; and also to the resinous compositions made of the resulting chlorinated polyethylene.

More particularly, the invention relates to a process for the preparation of chlorinated polyethylene by multi-stage chlorination of polyethylene powder in a heterogeneous system, which comprises first-stage chlorination of polyethylene powder at specific temperature range under introduction of chlorine until the product's chlorine content reaches the level below the ultimately desired chlorine content, interruption of the chlorine introduction, heat-treatment of the polyethylene powder under another specific temperature condition to cause substantial disappearance of the product's crystalline portion, and further chlorination under resumption of chlorine introduction at still another specific temperature condition until the desired chlorine content is obtained.

Still more specifically, the invention relates to the process for making chlorinated polyethylene by the above multi-stage chlorination, which is characterized by the steps of:
  (a) First stage chlorination of polyethylene powder to a chlorine content less than the desired value, under introduction of chlorine, at a temperature not exceeding the upper critical melting temperature (T) of crystalline portion of the starting polyethylene, and if during the progress of the chlorinating reaction the upper critical melting temperature of the chlorinated polyethylene fluctuates by ($\pm\Delta T$) at any time at a temperature not exceeding the fluctuated upper critical melting temperature ($T_a$),
  (b) Heat-treatment of the first-stage-chlorinated polyethylene at a temperature ($T_b$) exceeding the lower critical melting temperature of crystalline portion of said chlorinated polyethylene and the temperature at which the first stage chlorination is performed, following the interruption of chlorine introduction, and
  (c) Further chlorination of the heat-treated, chlorinated polyethylene until the desired chlorine content is obtained, under resumption of chlorine introduction at a temperature ($T_c$) below the above temperature ($T_b$).

Chlorination of polyethylene in homogeneous system as dissolved in solvent is known. Also chlorination of polyethylene in heterogeneous system wherein the polyethylene is either floated or suspended in an inert medium which does not substantially dissolve the starting polyethylene and the formed chlorinated polyethylene, is known. This invention concerns the latter heterogeneous system chlorination, and belongs particularly to an improved process of multi-stage chlorination in heterogeneous system.

The chlorination of polyethylene in heterogeneous system, e.g., suspension of polyethylene powder in aqueous medium such as water or in aqueous solvent which does not substantially dissolve the starting polyethylene and the formed, chlorinated polyethylene, or flotation of polyethylene powder in powdered inorganic salt such as silica, sodium chloride, etc., is more advantageous than homogeneous system polyethylene chlorination both economically and qualitatively, and therefore is widely practiced. This invention relates to an improved process of such heterogeneous system polyethylene chlorination, inter alia, the former aqueous suspension system multi-stage chlorination.

Proposals heretofore made concerning chlorination of polyethylene inclusive of the heterogeneous system multi-stage chlorination are indeed too many to enumerate, but none of them succeeded to achieve satisfactory results in all respects of operation, apparatus, cost and quality, leaving ample room for further improvements.

As only several of the heretofore made exemplary proposals on the production of chlorinated polyethylene in heterogeneous system, U.S. Pats. Nos. 2,926,159 (registered: Feb. 23, 1960); 3,071,569 (Jan. 1, 1963); 3,227,-781 (Jan. 4, 1966); 3,281,384 (Oct. 25, 1966); 3,282,910 (Nov. 1, 1966); 3,291,863 (Dec. 13, 1966); etc. can be named.

However, such a technical concept as set forth by the subject process, i.e., under the combined requisites on the multi-stage chlorination at the temperature conditions specified in (a) and (c), a heat-treatment at specific temperature conditions while the chlorine introduction is temporarily stopped, is performed as the step (b), whereby once substantially eliminating the crystalline portion of the polymer and thereafter introduction of chlorine gas is resumed under specific temperature condition to further chlorinate the polymer so as to regenerate the crystalline portion in the step (c), has never been proposed or even remotely suggested. Furthermore, it is entirely unpredictable that the described means can achieve the already mentioned qualitative improvements.

Generally speaking, the chlorination of polyethylene in heterogeneous system as intended in the invention performed at the mildest possible temperature condition as will not cause substantial melting and disappearance of crystalline portion of the polyethylene, normally around the lower critical limit of melting temperature of the crystalline portion or below, tends to produce relatively hard plastics of poor solvent-solubility which is insoluble in conventionally employed organic solvents such as aromatic hydrocarbons, ketones, esters, etc., at room temperature, because innegligible quantity of crystalline portion still remains when the chlorine content of the polyethylene reaches 50% by weight or even above. On the other hand it is also true that the aggregation of starting polyethylene particles and the formed chlorinated polyethylene particles is little in the chlorination at such mild temperatures, and therefore uniform chlorination operation is facilitated, and equipmental troubles tend to be reduced.

Conversely, if the chlorination of polyethylene in heterogeneous system is performed at higher feasible temperatures as will cause melting and disappearance of most or substantially all the crystalline portion of the polyethylene, normally around or above the upper critical temperature of melting the crystalline portion, the crystalline portion substantially vanishes when the chlorine content of the polyethylene reaches 30% by weight or even less, and solvent-soluble, relatively soft elastomeric chlorinated product can be obtained. The product is soluble in the widely used organic solvents as previously enumerated, at normal temperature, and provides excellent resin compositions as blended with, for example, polyvinyl chloride to improve the latter's impact resistance. On the other hand, under such high chlorination temperatures, the starting polyethylene as well as the formed chlorinated polyethylene particles are apt to aggregate, making the controlling of reaction difficult. Consequently the uniform chlorination is hardly achieved, and apparatus troubles tend to be increased due to the severer requirements for corrosion resistance, pressure resistance, etc. Furthermore, the resulting chlorinated polyethylene shows reduced tensile strength which renders the single use of the polymer impracticable. Also when it is used as resin blend as above-mentioned, it causes appreciable deterioration in tensile strength and transparency of the blend.

We have engaged in the research works in the purpose of providing an improved method of making chlorinated polyethylene which retains the advantageous aspects generally observed in the conventional practices, while avoiding the disadvantages inherent in the known processes, so that chlorinated polyethylene of improved properties can be produced with good qualitative reproducibility and operational as well as equipmental advantages. We now found, after the laborous studies, that a process for the preparation of chlorinated polyethylene which retains the advantageous aspects of the above-described low temperature and high temperature reaction systems, while skillfully overcoming the respective disadvantages is provided, by the combination of multi-stage chlorination system comprising the steps (a) and (c) under the specific temperature conditions somewhat higher than that of the conventional low temperature chlorination but somewhat lower than that of the conventional high temperature chlorination, with heat-treatment step (b) under specific temperature condition and interruption of chlorine introduction into the reaction system, which is inserted between the steps (a) and (c), in the known heterogeneous system chlorination.

As demonstrated later by controls, the advantages of the subject process are markedly reduced or impaired if, not speaking of the omission of step (b) in the combination of steps in accordance with the invention, only one of the temperature conditions specified for each step is deviated.

Accordingly, an object of the invention is to provide a process for the preparation of chlorinated polyethylene of improved properties by chlorinating polyethylene powder in heterogeneous system, which retains the advantages of conventional practice while conveniently overcoming the qualitative, operational, and equipmental disadvantages inherent in conpentional processes.

Still another object of the invention is to provide a process for the preparation of elastomeric chlorinated polyethylene which exhibits favorable pliability as well as tensile strength, without the operational and equipmental disadvantages.

The third object of the invention is to provide a process for the preparation of chlorinated polyethylene to be blended with vinyl chloride resin, which exhibits excellent impact strength, transparency, and appearance, without the operational and equipmental disadvantages.

The fourth object of the invention is to provide a process for the preparation of elastomeric chlorinated polyethylene of high quality which is useful by itself, with operational and equipmental advantages brought about by the adoption of lower chlorination temperature compared with those of past proposals.

The fifth object of the invention is to provide improved resinous compositions utilizing the chlorinated polyethylene of improved properties.

Still many other objects and advantages of the invention will become more apparent from the following descriptions.

In the present invention, polyethylene powder is multi-stage chlorinated in heterogeneous system. Formation of such heterogeneous system per se is known. As the medium to constitute such heterogeneous system, those which do not substantially dissolve the starting polyethylene and chlorinated polyethylene are used. Specific examples of useful media include water and aqueous media such as water-hydrochloric acid, and water-inorganic salts, e.g., NaCl, $CaCl_2$, $Na_2SO_4$, etc. The heterogeneous system can be formed by adding polyethylene powder to such a medium to form an aqueous suspension.

Furthermore, heterogeneous system formed by mixing polyethylene powder with powder of solid inorganic salt, such as NaCl, silica, etc. to cause floating of the former in the later is also known. The subject system can be practiced with such heterogeneous system, but aqueous suspension system employing water or aqueous medium which does not substantially swell or dissolve the starting polyethylene and chlorinated polyethylene is the more preferred, for easier control of the reaction and better quality of the resulting chlorinated polyethylene.

The process for preparing the starting polyethylene is not critical, which may be high pressure, medium pressure, or low pressure polymerization process. Also copolymers of ethylene containing normally less than 20 mol percent, preferably less than 10 mol percent, of comonomer may be used as the starting material. As such comonomers, for example, those co-polymerizable with ethylene, such as propylene, butene - 1,2 - methylpentene - 1, vinyl acetate, etc. may be named. Preferred starting material includes polymers of which at least 90% is composed of ethylene, having a density of at least 0.940 and a viscosity-average molecular weight of at least 10,000; and polyethylene having the upper critical melting temperature of the crystalline portion exceeding 90° C., and a density of less than 0.940.

Particle size of the starting polyethylene is not critical, but normally the polyethylene powder of average particle diameter not exceeding 1 mm. is used. Preferably the average particle diameter is not more than 0.5 mm., and the powder contains no particle of the diameter exceeding 1 mm. The optimum particle size ranges in, terms of average diameter, around 0.5 to 0.01 mm.

The means of polyethylene chlorination in aqueous suspension system under introduction of chlorine is known per se. The known means can be employed, explanation thereof being omitted herein to avoid redundancy. For example, the reaction can be performed under either atmospheric or elevated pressure, and in the optional presence of catalyst. Under high temperatures, or high temperatures and pressures, the reaction progresses at satisfactory rate in the absence of catalyst, but under low temperature conditions or low temperature and elevated pressure conditions, suitable catalyst can be conveniently employed. As the catalyzing means, irradiation of the reaction system with actinic light, for example, luminescent lamp, mercury lamp, incandescent lamp, etc.; or addition of radical-forming agent such as tert.-butylhydroperoxide, azo-bis-isobutyronitrile, tert.-butylperbenzoate, benzoyl peroxide, methyl ethyl ketone peroxide, etc. to the suspension, may be employed.

Generally speaking, in the chlorination of polyethylene powder in aqueous suspension system, the chlorinated polyethylene particles tend to aggregate when their chlorine content reaches approximately 25–40% by weight. This presents no problem when the chlorinating temperature is lower than the melting point of the crystalline portion of polyethylene by 50° C. or more, but when chlorinating temperature higher than that is employed, use of suspension stabilizer is recommended, because the stabilizer will also serve to prevent the aggregation.

As such suspension stabilizer, the following may be named as specific examples:

(i) Water-soluble polymer or copolymer of which not less than 50 mol percent is composed of a monomer selected from the group consisting of acrylic acid and methacrylic acid; water-soluble, partially esterified product of above polymer or copolymer of which carboxylate radicals are partially esterified; and water-soluble salts of above polymer, copolymer, or the partially esterified product:

As the comonomers which can occupy less than 50 mol percent of the above copolymer, for example, styrene, methyl vinyl ether, ethyl vinyl ether, acrylamide, methacrylamide, 1-vinyl-2-pyrrolidone, 1-vinyl-3-pyrrolidone, 1-vinyl-3-methyl-2-pyrrolidone, maleic acid, etc. may be named. Also as the water-soluble salts, for example, sodium salt, potassium salt, and ammonium salt may be used.

Among the above-named, water-soluble polymers of the monomer selected from the group consisting of acrylic acid and methacrylic acid, of the molecular weight not less than 10,000; water-soluble, partially esterified products thereof; and their water-soluble salts; are preferred.

(ii) Water-soluble polymer or copolymer of which not less than 50 mol percent is composed of a monomer selected from the group consisting of acrylamide and methacrylamide:

As the comonomer which may occupy less than 50 mol percent of the copolymer, those monomers and comonomers enumerated for above group (i) excepting acrylamide and methacrylamide, can be used.

Among the above, water-soluble polymers of a monomer selected from the group consisting of acrylamide and methacrylamide, of the molecular weight ranging from 10,000 to 3,000,000 are preferred.

(iii) Water-soluble polymer or copolymer of which not less than 50 mol percent is composed of maleic acid; water-soluble, partially esterified products of the polymer or copolymer of which carboxylate radicals are partially esterified; water-soluble salts of above polymer, copolymer, or partially esterified product:

As the copolymers which may occupy less than 50 mol percent of the copolymer, the monomers and comonomers enumerated in above group (i), excepting maleic acid, can be used.

Among the above, copolymers made of 50 mol percent of maleic acid and 50 mol percent of other comonomers, partially esterified products thereof and salts thereof are preferred. Particularly the esterified products of copolymers composed of 50 mol percent of maleic acid and 50 mol percent of styrene or methyl vinyl ether, of which one carboxylate radical of the maleic acid is esterified with an alkyl of 1 to 4 carbons, and salts thereof are preferred.

(iv) Water-soluble polymer or copolymer of which not less than 50 mol percent is composed of vinyl pyrrolidones:

As the useful comonomer, the monomers or comonomers enumerated for the group (i) above, excepting vinyl pyrrolidones, can be used.

Among the above-named, 1-vinyl-2-pyrrolidone polymers of the molecular weight ranging from approximately 10,000–1,000,000 are preferred.

Addition of minor amount of such suspension stabilizer, normally not more than 10% by weight to the starting polyethylene, for example, 0.1–5% by weight, to the aqueous suspension system achieves also the effective prevention of aggregation.

Those suspension stabilizers can be easily removed by washing the product chlorinated polyethylene with aqueous alkali, for example, aqueous solution of alkali metal hydroxide, alkali metal carbonate, alkali metal bicarbonate, normally caustic soda, caustic potash, sodium carbonate, potassium carbonate, sodium bicarbonate, and potassium bicarbonate. Furthermore, if the washing is insufficient to remove the trace of residual stabilizer, it will not cause appreciable coloring detrimental to the quality of the product, nor will deteriorate heat stability of the product. Therefore the foregoing suspension stabilizers are recommendable for the subject process. They may be added to the reaction system from the very initial stage, or in aliquots during the reaction.

Although not recommended, conventional means for the prevention of aggregation may be employed if desired. For example, the initial stage of the chlorination reaction may be performed at as low as possible temperature to form hard film on the surfaces of polyethylene particles, and thereafter the temperature is raised to continue the chlorination; or the chlorination may be performed under addition of organic or inorganic solid, fine powder of, for example, polyvinyl chloride, silica, etc.; or under addition of polyvinyl alcohol.

However, the first-mentioned conventional practice hardly achieves the desired prevention effect, unless such low temperatures as not less than approximately 50° C. below the melting point of crystalline portion of polyethylene is employed. Consequently, reaction time of the initial stage is unduly prolonged, and the chlorination tends to become non-uniform. Also in the second known practice, the solid, fine powder is apt to remain in the product, objectionably affecting the product's quality. Furthermore, in the third means, the polyvinyl alcohol also is chlorinated, forming a product which is unstable to heat, air, and alkali, and occasionally causes coloring of the chlorinated polyethylene.

Thus, since those known means cannot be utilized without certain drawbacks, use of afore-named suspension stabilizers is recommended in the present invention.

Incidentally, in this specification and claims, the upper or lower critical melting temperature of crystalline portion of polyethylene or chlorinated polyethylene signify the following:

Determination of upper critical melting temperature, lower critical melting temperature, and the melting point:

The melting point of crystalline portion and melting temperature range are determined by measurement with differential scanning calorimeter (DSC). This will be hereinafter referred to as DSC method.

The temperature range at which the endothermic phenomenon due to melting of the crystalline portion is observed by DSC method is called the melting temperature range, and in which the lowest temperature (that at which the melting of crystalline portion begins, and the endothermic phenomenon due to the melting is first observed) is called the lower critical melting temperature, and the highest temperature (that at which the crystalline portion melts and disappears, and the endothermic phenomenon due to the melting is no more observed) is set to be the upper critical melting temperature. Within the temperature range at which the endothermic phenomenon is observed, the point at which the heat absorption reaches the peak is called the melting point of crystalline portion.

Various means are known for measuring the melting point and crystallinity of the crystalline portion, and the melting point determined by the DSC method substantially corresponds with the values determined by those known methods.

The melting temperature range of crystalline portion of polyethylene differs for each polymer depending on the method of polymerization, presence of copolymerized components, quantities thereof, etc., and that of chlorinated polyethylene is further affected by, besides the above-named factors attributable to starting polyethylene, chlorine content, chlorination temperature, etc. With polyethylene, in majority of the cases the range covers from approximately 25–30° C. below the melting point to the vicinity of 10° C. above the melting temperature.

Taking an example of high pressure process polyethylene of 20 in melt index and 0.918 in density, the melting temperature range of crystalline portion is 80°–110° C., and the melting point is 105° C. Also those of the polyethylene having a melt index of 0.3 and a density of 0.923 are, respectively, 87°–115° C., and 110° C. Again those of a low pressure process polyethylene having a melt index of 6.0 and a density of 0.945 are, respectively, 95°–127° C. and 124° C. With another polyethylene having a melt index of 5.5 and a density of 0.970, they are respectively 116°–133° C. and 133° C. Still another polyethylene having a melt index of 0.04 and a density of 0.955 showed the melting temperature range of 97°–138° C., and the melting point of 132° C.

As to chlorinated polyethylene, there is generally a tendency that, when the chlorination temperature is below the melting point of the crystalline portion, the greater the difference between the chlorination temperature and the melting point, the lower the melting point of crystalline portion of the chlorinated polyethylene. There is also a tendency that the lower limit of the melting temperature range, i.e., the lower critical melting temperature, drops at the initial stage of chlorination. Within a certain range at which the difference between the chlorination temperature and the melting point is allowably close, there are the cases wherein the melting point of crystalline portion of chlorinated polyethylene shows slight rise.

Generally the quantity of remaining crystalline portion of chlorinated polyethylene reduces with the progress of chlorination reaction, the reduction rate being greater under higher chlorination temperature. However, even when the chlorination temperature is higher than the melting point of crystalline portion, the crystalline portion does not substantially completely disappear, unless the chlorine content of the polymer exceeds 20–30% and the chlorination temperature exceeds the upper critical melting temperature.

In the first stage chlorination step (a) of the subject process, chlorination temperature not exceeding the upper critical melting temperature (T) of the crystalline portion of starting polyethylene is employed.

Because the melting temperature range of chlorinated polyethylene fluctuates, with the progress of chlorination reaction as above-mentioned, the upper critical melting temperature also fluctuates around the above critical temperature (T) of starting polyethylene. According to the subject process, when the upper critical melting temperature of the chlorinated polyethylene varies ($\pm \Delta T$) during the progress of chlorination reaction, the chlorination is performed at the temperatures not exceeding the fluctuating upper critical melting temperature, $$(T_a) = T \pm \Delta T$$

at any moment. In practice, the temperature range not exceeding the said limit and above 0° C., preferably the temperatures lower than the melting point by not more than 50° C., are employed.

This first stage chlorination reaction is preferably performed at the temperatures below the melting point of crystalline portion of starting polyethylene, until the chlorine content of the polymer reaches not less than approximately 10% by weight but less than the ultimately intended chlorine content. The chlorination temperature and chlorine content are suitably chosen according to the properties of intended product, but it is necessary that the chlorination temperature is below the upper critical melting temperature, and the chlorine content is less than the desired chlorine content for the final product.

For example, when pliable chlorinated polyethylene is wanted as the final product, preferably the chlorination temperature lower than the melting point of crystalline portion by 5–50° C. is employed. With the first stage chlorination to such a chlorine content as will allow the crystalline portion to remain under the employed temperature, the chlorination temperatures above the melting point of the crystalline portion but below the upper critical melting temperature of the crystalline portion can be employed.

The degree of chlorination in the first stage reaction is suitably variable also depending on the finally intended chlorine content of the chlorinated polyethylene and also on the number of cycles of the combined steps of (b) and (c) to be repeated in the subject process, i.e., number times of the heat-treating step (b) under interruption of chlorine introduction, to be performed before the end of the whole process. Whereas, it is recommended to perform the first stage chlorination to the chlorine content not less than approximately 10% by weight, but less than the ultimately desired chlorine content, for the full exhibition of the effect of heat-treatment step (b). For example, when the intended chlorine content of the final product chlorinated polyethylene is 30–40% by weight and it is to be achieved by one cycle of the combined steps (a), (b), and (c), the first stage chlorination is suitably performed until the chlorine content of 20–30% by weight is attained.

Normally when the heterogeneous system is aqueous suspension system, it is suitable to perform the first stage chlorination of step (a) to a chlorine content not less than 10% by weight, preferably 10–45% by weight, but less than the ultimately desired chlorine content, and to perform the second stage chlorination of step (c), after the heat-treatment of step (b), until the desired chlorine content higher than that of the first-stage-chlorinated polyethylene and not less than 20% by weight, preferably 20–55% by weight.

In any case, the first stage chlorination is performed under introduction of chlorine into the system, at the temperature conditions satisfying the above-specified requirements, until a chlorine content less than the ultimately desired level is attained, and the chlorine content as well as the chlorination temperature are selected to avoid substantially complete melting and disappearance of the crystalline portion. When the selected chlorine content is allowably low, relatively high chlorination temperature may be employed so far as the upper critical melting temperature is not exceeded. Whereas, when the chlorine content is allowably high, relatively low temperatures within and below the melting temperature range may be employed.

In the subject process, the chlorinated polyethylene resulting from the above first stage chlorination step (a) is subjected to a heat-treatment step (b), before the second stage chlorination step (c).

This heat-treatment step (b) is performed, after the interruption of chlorine introduction, at temperatures ($T_b$), exceeding the lower critical melting temperature of crystalline portion of the first-stage-chlorinated polyethylene and also exceeding the temperatures at which the first stage chlorination was performed. Preferably the temperature ($T_b$) is least 5° C., particularly at least 10° C., above the final temperature of the first stage chlorination. Normally the temperature is not higher than 200° C., preferably not higher than 160° C., but above the aforespecified level.

This heat-treatment step (b) is performed to temporarily cause substantial or complete melting and disappearance of the crystalline portion remaining in the first stage chlorination product, under the interruption of chlorine introduction. So far as the above object is achieved, the treating time is not critical. For example, the intended result can be achieved within such short time as 5 minutes or a few minutes.

It is observed that the lower critical melting temperature of crystalline portion of the chlorinated polyethylene appreciably drops in that occasion, as later demonstrated with FIGS. 1 through 4 taking the experiments of Examples 1 and 3 as the model case. It is further confirmed that the dropping phenomenon is more conspicuous when the heat-treating time is prolonged. Furthermore, the heat of fusion of the crystalline portion in that step is little changed by the length of the heat-treatment. Therefore, we judged that longer heat-treating time is preferred for the step (b) performed under interruption of chlorine introduction, which is an important step constituting the combined series of steps of the invention.

Such unique tendency and phenomenon induced on the melting temperature range of crystalline portion of first-stage-chlorinated polyethylene by the heat-treatment under interruption of chlorine introduction is entirely unknown.

It is observed that the properties of the crystalline portion of first-stage-chlorinated polyethylene are changed by the heat-treatment step (b).

According to our studies, when the heat-treating temperature ($T_b$), i.e. the temperatures above the lower critical melting temperature of crystalline portion of first-stage-chlorinated polyethylene and the chlorination temperature employed in the first stage reaction, exceeds the upper critical melting temperature of crystalline portion of first-stage-chlorinated polyethylene, both the melting point and melting temperature range of the crystalline portion become lower after the heat-treatment, than those before the heat-treatment, and the heat of fusion, i.e., the quantity of remaining crystalline portion, is reduced. We also discovered that, when the heat-treating temperature satisfies the foregoing requirement but is within the melting temperature range, the heat of fusion is reduced similarly to the previous case, and the lower critical melting temperature also shifts to lower temperature side compared with that before the heat-treamtent, but the melting point of the crystalline portion is not necessarily lowered, showing rise in certain case.

Now the variation of melting temperature range, upper and lower critical melting temperatures, and melting point of the crystalline portion will be explained as to a few model cases, referring to the attached drawings.

FIG. 1 is a graph showing the state of variation of foregoing temperatures in the steps (a), (b), and (c) of Example 1, and FIG. 3 is a similar graph concerning Example 3.

Referring to FIG. 1, the melting temperature range of starting polyethylene of zero chlorine content is shown with real line (1), and the melting point of its crystalline portions is indicated with double circles. The real line 2 shows the melting temperature range of the polyethylene when its chlorine content reached 12% by weight during the step (a). As demonstrated, compared with the real line 1, the lower critical melting temperature is somewhat lowered with the real line 2. Also the melting point of crystalline portion is lowered, while the upper critical melting temperature is about the same. The melting temperature range of the chlorinated polyethylene containing 26% by weight of chlorine as obtained from the step (a) is shown with the real line 3, in which the melting temperature range is narrowed in comparison with the lines 1 and 2, and both upper and lower critical melting temperatures rose, while the melting temperaturue of crystalline portion is about the same with that on line 2. The broken line 4 shows the melting temperaturue range of the first-stage-chlorinated polyethylene (real line 3) after the heat-treatment. It can be understood that the upper and lower critical melting temperatures as well as the melting point of crystalline portion (indicated with a triangle mark) are all considerably lowered than those of the first-stage-chlorinated polyethylene. The broken line 5 shows the melting temperature range of the product chlorinated polyethylene resulting from the second stage chlorination (c) following the heat-treatment (b). Compared with the broken line 4, the range is markedly narrowed, i.e., the upper critical melting temperature is lowered, while the melting point of crystalline portion (indicated with a triangle mark) and lower critical melting temperature are heightened.

Also in FIG. 1, the melting temperature range of the product chlorinated polyethylene of Control C given with Example 1 is shown by dotted line 5', illustrating the remarkably different result from the broken line 5.

FIG. 3 is a graph similar to FIG. 1, except that it shows the results of Example 3, in which the real lines 1 and 3, and broken lines 4 and 5 all show the melting temperature range of the polyethylene at different stages similarly to the above explanations as to FIG. 1. The marks ⊚ and △ have the same significations as described above.

Figure 2:
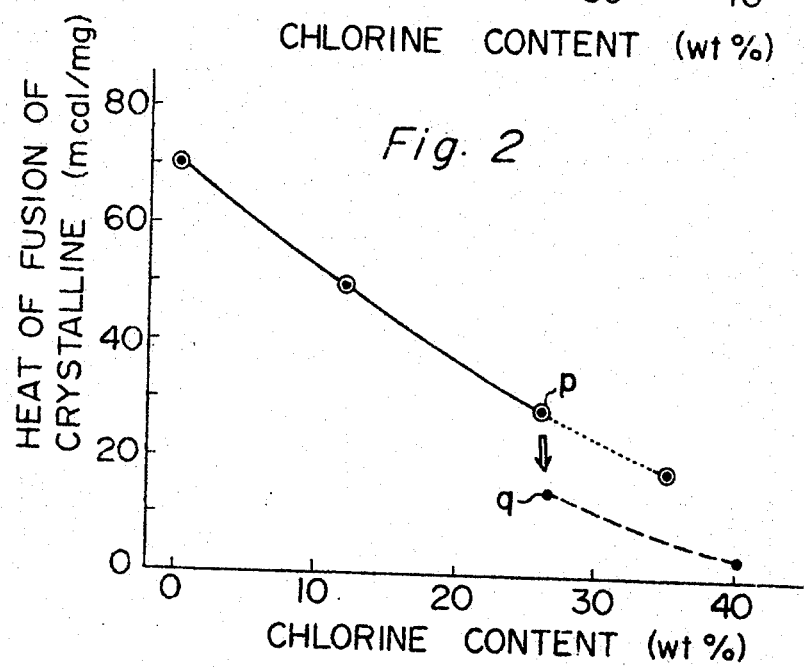

FIG. 2 is a graph showing the variation in heat of fusion of crystalline portion at the different steps of Example 1 as specified as to FIG. 1, and FIG. 4 is a similar graph drawn as to Example 3.

In FIG. 2, the black dots indicate the heat of fusion (m cal./mg.) of crystalline portion at different chlorine contents attained at the different stages as explained as to real lines 1, 2, 3, broken lines 4, 5, and the dotted line 5' of FIG. 1. The heat of fusion of the crystalline portion of the polyethylene is lowered to the point $p$, along the real line, due to the first stage chlorination (a), and again abruptly dropped to the point $q$, as indicated with an arrow, after the heat-treatment (b), to be further lowered along the broken line 1 during the step (c). On the other hand, as indicated with dotted line, in Control C such abrupt changes in heat of fusion of crystalline portion induced by the heat-treatment did not take place. FIG. 4 also shows the variation in heat of fusion as to Example 3, in the manner similar to FIG. 2.

It will be readily understood, also from the results of later-given controls, that the heat-treatment step (b) under the interruption of chlorine introduction performed between the steps (a) and (c) to form an integral series is essential for the present invention.

In this heat-treating step (b), the chlorine content of polyethylene may slightly increase due to the chlorine which may be remaining in the system, but it is desirable to keep the increase below 1% by weight. For example, when the chlorine content of the first-stage-chlorinated polyethylene immediately before the heat-treating step is 25% by weight, it is desirable that the chlorine content thereof after the heat-treatment and before the second stage chlorination should not exceed 26% by weight. This can be advantageously achieved by expelling the residual chlorine in the system with inert gas such as gaseous nitrogen, carbon dioxide, argon, helium, etc., or with other gases which little affect the system, e.g., air, before the heat-treating step (b), or by retarding the temperature rise to the level ($T_b$) in the heat-treating step, until substantially all of the residual chlorine is reacted. Those means are particularly useful for the purpose of making elastomeric chlorinated polyethylene having sufficient tensile strength.

Thus heat-treated chlorinated polyethylene is subjected to the second stage chlorination (c) until the ultimately intended chlorine content is obtained, under resumption of chlorine introduction.

This second stage chlorination (c) is performed after cooling the reaction system to the level below the heating temperature ($T_b$) of the heat-treating step (b). In that case, rapid quenching of the system to an optional temperature below ($T_b$), preferably the temperature below and within the melting temperature range of the chlorinated polyethylene after the step (b), to accelerate the regeneration, i.e. recrystallization, of crystalline portion of the heat-treated, chlorinated polyethylene, often give favorable results. This cooling can also be effected by rapid quenching to a level below the intended temperature, and thereafter restoring the temperature to the initially intended level.

The degree of chlorination in this step (c) is performed until the ultimately intended chlorine content is obtained, if the final product is to be obtained through one cycle of the combined steps of this invention. Obviously, if the final product is to be obtained through repetition of the cycle, the step (c) is stopped before the ultimately intended chlorine content is reached.

The chlorination of this step (c) shows appreciable result even when the whereby caused increase in chlorine content is only 1-2% by weight or even less. For example, recognizable effect is obtained when chlorinated polyethylene containing 25% by weight of chlorine after the first stage chlorination is chlorinated in the second stage to a chlorine content of 26% by weight. However, recommendably the increase is chlorine content of the polyethylene caused by the second stage chlorination is at least 1% by weight, preferably at least 2% by weight, plus that after the first stage chlorination. As later demonstrated by control, the object of this invention cannot be achieved if this step (c) is omitted.

The second stage chlorination temperature of step (c) in suitably variable depending on such factors as the state of variation in nature of crystalline portion of chlorinated polyethylene caused by the heat-treating step (b) as already mentioned, the desired properties of the final product chlorinated polyethylene, degree of desired increase in the chlorine content, number times of the cycles of combined steps to be performed, etc.

In the subject process, the treating conditions of each of the steps (a), (b), and (c) are suitably variable in accordance with the desired properties of the object final product, within the ranges satisfying the foregoing requirements on the combination of the steps.

For instance, for the preparation of elastomeric chlorinated polyethylene of high tensile strength and oil resistance, the steps (a) and (c) are always performed at temperatures lower than the melting point of the crystalline portion, preferably by 5° C.-20° C., particularly by 5° C. to 15° C., and between them the step (b) is practiced at temperatures above the melting point of the crystalline portion and also above the first stage chlorination temperature, performing the cycle of such steps (b)-(c) one to three times, to chlorinate the starting polyethylene to a chlorine content of 10 to less than 45% by weight, preferably 20 to less than 42% by weight, before the step (c) of the last cycle, and to the ultimately desired chlorine content which may be 30-50% by weight, preferably 35-47% by weight, through step (c) of the last cycle. The higher the chlorination temperatures and heat-treating temperature within the specified temperature ranges for the steps (a), (b), and (c), and the more the number times of heat-treating step, i.e. the more the number of cycle, the less the residual crystalline portion of the finally obtained chlorinated polyethylene, i.e., the product is more pliable. However, soft products tend to exhibit reduced tensile strength and oil resistance. Therefore the optimum conditions should be selected in accordance with the properties desired for individual chlorinated polyethylene. Normally the softest chlornated polyethylene is obtained with the chlorine content ranging from 30 to 40% by weight.

When the product is to be used as an improving agent of impact resistance of polyvinyl chloride or post-chlorinated polyvinyl chloride, the product's chlorine content suitably ranges 25-55% by weight. Greatest impact resistance is normally obtained with the product containing 30-40% by weight of chlorine. When chlorinated polyethylene of little residual crystalline portion is blended, the blend tends to show appreciable reduction in tensile strength, although its impact strength can be satisfactorily improved. The degree of reduction in tensile strength tends to become less as the chlorine content of the chlorinated polyethylene to be blended increases. By broadening the chlorine content distribution by such means as mixing chlorinated polyethylenes of different chlorine contents, better improving agent, which satisfactorily improves impact resistance while little reducing tensile strength, when blended with polyvinyl chloride or post-chlorinated polyvinyl chloride, can be obtained.

When chlorinated polyethylene which is soluble in conventionally used solvents, e.g., aromatic hydrocarbons, chlorinated hydrocarbons, ketones, etc. is wanted, the steps (b)-(c) cycle should be repeated so that the chlorinated polyethylene is heat-treated plural times at the temperatures within the range specified for the step (b) and thoroughly removed of the residual crystalline portion. Whereby chlorinated polyethylene of good solvent-solubility can be obtained, which is an excellent coating material. Such solvent-soluble products are often required to have low molecular weight in view of suitable solution viscosity. According to the subject process, aggregation among the particles can be more easily prevented because the chlorination reaction can be performed at lower temperatures than those conventionally employed. Consequently, softer chlorinated polyethylene of excellent heat stability and weatherability and less coloring than those of conventional products can be obtained.

Generally speaking, more favorable results can be obtained of the invention when, in correlation with the step (b), the temperature conditions of steps (a) and (c) are as follows: the first stage chlorination temperature of step (a) does not exceed the upper critical melting temperature (T) of crystalline portion of the starting polyethylene and the temperature ($T_a$) as already specified, and also below the upper critical melting temperature of the heat-treated, chlorinated polyethylene, preferably lower than the crystal-melting point of the starting polyethylene by 10°-60° C.

The chlorinated polyethylene as the reaction product is washed and dried in the conventional manner, before serving as the final product. The washing may be effected with water and/or, if desired, aqueous alkali, to thoroughly remove the remaining suspension stabilizer or chlorine ion. The washing is preferably performed under mildly elevated temperature above room temperature but below approximately 80° C., for better washing effect than normal temperature washing.

According to the subject process, soft, elastomeric product can be prepared at conventionally impracticable low temperatures. This brings about numbers of advantages in respect of the apparatus, operation, and quality of the product. That is, at lower chlorination temperatures, sidereactions such as decomposition of chlorinated polyethylene in the reaction system are reduced, and products of better heat stability, oxidation resistance, weatherability, etc. can be more easily obtained. Also the appartaus and operation can be simplified. According to the invention, soft product can be obtained in certain cases at temperatures as low as below 100° C., i.e., at atmospheric pressure. Apparatuses for performing the chlorination under elevated pressure are very expensive compared with the reaction apparatus for normal pressure and low temperature operation, because of their special construction material and structure. They are also difficult of fabrication. whereas, the chlorination of the invention can be practiced with normal pressure chlorination apparatus of less cost and greater structural freedom. If the heat-treatment is effected separately in cheap and easily manufactured iron or stainless steel vessels after eliminating or neutralizing the side-produced hydrochloric acid, etc., while the chlorination steps are performed in the normal-pressure chlorination apparatus, soft chlorinated polyethylene which can be used as elastomer by itself or advantageously blended with other synthetic resins is obtainable, using as a whole cheap apparatus of greater structural freedom. Such has been difficult with conventional techniques, and therefore constitutes an advantageous aspect of the invention.

Another advantage of the subject process is that, soft and occasionally solvent-soluble chlorinated polyethylene can be easily formed at lower temperatures than those conventionally employed, even when considerably low molecular weight polyethylene is used as the starting material, due to adoption of the heat-treating step and use of highly effective suspension stabilizer such as acrylic acid polymer.

The chlorinated polyethylenes prepared by the subject invention are useful for almost all known utilities of chlorinated polyethylene, with many advantages.

When they are used by themselves, or as added to other synthetic resins or elastomer, either as they are or after cross-linking to form elastomer, products of high tensile strength and oil resistance are obtained. Also when they are blended with ABS resin, polyethylene, etc. to improve their combustion resistance, products of good impact resistance can be obtained with little deterioration in tensile strength and oil resistance. For the mentioned utilities, polyethylenes of at least 10,000, preferably at least 20,000, in molecular weight which are chlorinated to chlorine content of 30–55% by weight are suitably used.

For improving impact resistance of polyvinyl chloride, normally polyethylenes of at least 20,000 in molecular weight which are chlorinated to chlorine content of 25–40% by weight are employed. The chlorinated polyethylenes of the invention show good compatibility with polyvinyl chloride, and readily give the products of good surface properties with little reduction in tensile strength.

As the coating materials to be used as dissolved in solvent, normally polyethylenes of not more than 50,000 in molecular weight which are chlorinated to chlorine content of not less than 35% by weight are used. According to the invention, excellent product which shows low solution viscostiy and little coloring, and forms pliable coating without plasticizer, can be obtained.

Those advantages are all attributable to the adoption of heat-treatment step inserted between chlorination steps, which is performed under interruption of chlorine introduction to once melt the residual crystalline portion, and to the preferred use of suspension stabilizers such as the polymers of acrylic acid, methacrylic acid, maleic acid, etc. to facilitate the heat-treating step.

As already mentioned, the chlorinated polyethylenes of the invention are useful as elastomer by itself, for such utilities as hose, belt, electric wire covering, gasket, artificial leather, etc. Whereas, they may also be blended with other synthetic resins and elastomers such as polyolefins, e.g., polyethylene and polypropylene, ABS resins, rubber, etc.

Main purpose of their blending with polyolefins and ABS resins is the praparation of incombustible product. Preferred blends are formed by using the chlorinated polyethylene containing 30–50% by weight of chlorine, in an amount ranging 10–30% by weight of the composition. Concurrent use of particularly antimony trioxide is useful to enhance the flameproof property. Also conventional stabilizers of polyvinyl chloride may be added to prevent decompoistion of chlorinated polyethylene.

The object of blending chlorinated polyethylene with other elastomers such as rubber is to improve the latter's properties such as weatherability, oil resistance, and combustion resistance, etc.

Chlorinated polyethylene is added to polyvinyl chloride or post-chlorinaed polyvinyl chloride for two different purposes.

One case is the addition of only minor amount of chlorinated polyethylene to polyvinyl chloride or post-chlorinated polyvinyl chloride of low impact strength, to improve said porperty. For all this purpose, the amount of chlorinated polyethylene used is normally not more than 30 parts to the total resin component, preferably 3–20 parts. As clearly demonstrated in Table 7 of later given examples, the chlorinated polyethylenes prepared by the subject process give compositions, when blended with polyvinyl chloride, of excellent tensile strength and transparency, compared with conventionally prepared chlorinated polyethylenes. If improvement in tensile strength and transparency is not appreciable, the composition shows markedly superior impact resistance. It is also the characteristics of the invention that whereby products of excellent workability and surface luster can be obtained. The subject process is particularly favorably applied to chlorinate polyethylenes of not less than 20,000 in viscosity-average molecular weight to the ch!orine content of 25–45% by weight. The optimum chlorinaed polyethylene can be obtained by chlorinating high density polyethylene of 30,000–200,000 in viscosity-average molecular weight, having a density of not less than 0.940, at the chlorination temperatures of steps (a) and (c) lower than the crystal-melting point of the starting polyethylene by 5°–30° C., to a chlorine content of 30–40% by weight. When the chlorine content is less than 25% by weight, deterioration in tensile strength and transparency of the blend is remarkable. Whereas, if it is more than 45% by weight, little improvement in impact strength is achieved. Particularly when complex shaped product is to be formed, polyethylenes of 30,000–100,000 in viscosity-average molecular weight are the suitable starting material.

In another case, polyvinyl chloride may be added to chlorinated polyethylene to improve the former's tensile strength and reduce cost, in the preparation of electric wire coating, artificial leather, sheet, etc. In such a case again the chlorinated polyethylene of the invention exhibits high tensile strength and oil resistance, as demonstrated by one specific example in Table 3. For the soft blend composed mainly of chlorinated polyethylene, it is recommended to use polyethylenes of 30,000–300,000 in viscosity-average molecular weight, having density of not less than 0.940 as the starting material, chlorinating them at the chlorination temperatures of steps (a) and (c) lower than the crystal-melting point of starting polyethylene by 5–30° C., to chlorine content of 30–50% by weight.

Obviously, use of known additives to polyvinyl chloride blend, such as stabilizer, lubricant, plasticizer, filler, pigments, etc. in those cases will achieve the corresponding result. In certain cases, us of cross-linking agent such as organic peroxide may produce favorable result.

Those compositions can be readily worked with shaping machines such as rolls, calender, extruder, injection molder, etc.

The examples given hereafter are strictly for more concretely demonstrate the effect of this invention, but in no case to be construed to limit the scope thereof.

EXAMPLES 1 AND 2: CONTROLS A, B, AND C

A glass-lined autoclave of 100 liters in capacity was charged with 7 kg. of polyethylene powder having a density of 0.955, melt index of 0.04, melting temperature range of the crystalline portion of 97°–138° C., melting point of 132° C., and a viscosity-average molecular weight of 120,000, which was prepared by low pressure process in the presence of Ziegler catalyst; 70 liters of deionized water; 1.5 g. of an emulsifier composed chiefly of a block copolymer of polyethylene oxide and polypropylene oxide; and 105 g. of aqueous solution of acrylic acid polymer of pH 2.0, density 1.11, viscosity at 20° C. 2,000 cp., and solid component 30%, as the suspension stabilizer. The air in the reactor was driven off with nitrogen gas, while the system was stirred. Thereafter chlorine gas was introduced into the reactor at an elevated pressure, at 120° C. in Example 1 and Control C, and 110° C. in oher runs. The chlorination was performed under the reaction pressure maintained at 3–4 kg./cm.$^2$. During the reaction, in Examples 1 and 2 the chlorine introduction was interrupted when the chlorine content reached, respectively, 26% and 28% by weight, the systems were cooled to 85° C., the unrecated chlorine gas was driven off with nitrogen gas, and 105 g. of the above suspension stabilizer composed of the specified acrylic acid polymer was added, followed by heating at 140° C. for respectively 120 and 30 minutes. After the heat-treatment, the systems were cooled to 110° C., and under resumption of chlorine gas introduction, chlorinated to chlorine contents of, respectively, 40 wt. percent and 36 wt. percent, at 110° C. The increase in chlorine content during the heat treatment was 0.2 wt. percent in Example 1, and 0.3 wt. percent in Example 2.

In the Controls A and B, the chlorine introduction was interrupted when the reaction products' chlorine contents reached, respectively, 25 wt. percent and 20 wt. percent, and the systems were cooled to approximately 85° C. After the subsequent addition of 105 g. of the suspensions stabilizer composed of the acrylic acid polymer, the systems were heated to 140° C., and immediately second-stage chlorinated at said temperature, to the chlorine contents of, respectively, 40 wt percent and 35 wt. percent.

In Control C, chlorine introduction was continued without interruption, until the product's chlorine content reached 35 wt. perecnt at 120° C.

Thus obtained chlorinated polyethylenes were washed twice with deionized water at room temperature for 10 minutes each, then with diluted aqueous sodium carbonate at 80° C. for 120 minutes while maintaining pH of the washing at 7-10, and further washed 5 times with normal temperature deionized water for 10 minutes each.

The chlorinated polyethylenes obtained through subsequent fluidized drying for approximately 24 hours at 50°–60° C. were white powder of the particle diameters not more than 1 mm. in all runs. The properties of the chlorinated polyethylene are given in Table 1 below.

Furthermore, chlorinated polyethylene sheets of approximately 1 mm. in thickness, made of the products of Examples 1 and 2, and Controls A and B, were immersed in No. 2 oil specified in JIS K6301–1969, for 18 hours at 70° C., and percent retention of the initial properties were measured, with the results shown in Table 2.

TABLE 2

Properties' retention after JIS No. 2 oil immersion test (percent)

| Chlorinated polyethylene | 1 | 2 | A | B |
|---|---|---|---|---|
| Tensile strength | 88 | 34 | | |
| 100% modulusg | 60 | 38 | | |
| Elongation at breaking point | 123 | 70 | Degradation | |
| Hardness | 65 | 46 | | |
| Permanent elongation | 195 | 91 | | |

From the results of above Tables 1 and 2, it can be understood that chlorinated polyethylenes of high tensile strength, lower 100% and 200% modulus, higher elongation at breaking point, lower permanent elongation, and excellent oil resistance can be obtained according to the subject process. The products of Controls A and B are markedly inferior in oil resistance. The product of Control C exhibited objectionably large 100% modulus, excessively low elongation at breaking point, unduly high hardness, and immeasurable permanent elongation, and could not be used as elastomer.

Furthermore, when blended with vinyl chloride resin to be used for electric wire coating, the products of the subject process gave the composition of higher tensile strength, and markedly better properties after the oil immersion test. This can be understood by comparing Example 1 with Control A, and Example 2 with Control B, which were of approximately the same chlorine content, and by referring to the data in Table 3 below. Incidentally, the test pieces were prepared as follows:

Thirty (30) parts of polyvinyl chloride of 2,500 in molecular weight prepared by suspension polymerization, 20 parts of dioctyl phthalate, 2 parts of tribasic lead sulfate, 1 part of dibasic lead sulfate, 2 parts of dibasic lead phosphite, 2 parts of tin maleate-dibutyl, and 0.5 part of stearic acid amide, were milled for 4 minutes with twin rolls heated to 140° C., and to the mixture 100 parts of chlorinated polyethylene was added, followed by further 6 minutes' milling. The mixture was then hot-pressed with thermopress of 150° C. under a pressure of 100 kg./cm.² for 10 minutes.

TABLE 1

| Chlorinated polyethylene | 1 | 2 | A | B | C |
|---|---|---|---|---|---|
| Starting polyethylene: | | | | | |
| Type | (⁴) | | | | |
| Density (g./cm.³), JIS K6760–1966 | 0.955 | | | | |
| Melt index (g./10 m n.) JIS K6760–1966 | 0.04 | 0.04 | 0.04 | 0.04 | 0.04 |
| Melting point (° C.), DSC method ¹ | 132 | | | | |
| Heat of fusion of crystalline portion (m cal./gm.), DSC method ¹ | 70 | | | | |
| First stage chlorinations: Temperature (° C.) | 120 | 110 | 110 | 110 | 120 |
| After first stage chlorination: | | | | | |
| Chlorine content (percent) | 26 | 28 | 25 | 20 | |
| Melting point (° C.), DSC method ¹ | 130 | 125 | 126 | 127 | |
| Heat of fusion of crystalline portion (m cal./mg.), DSC method ¹ | 31 | 32 | 35 | 39 | |
| Heat-treatment: | | | | | |
| Temperature (° C.) | 140 | 140 | | | |
| Time (minutes) | 120 | 30 | | | |
| After heat-treatment: | | | | | |
| Melting point (° C.), DSC method | 116 | 115 | | | |
| Heat of fusion of crystalline portion (m cal./mg.) DSC method ¹ | 15 | 17 | | | |
| Second stage chlorination: Temperature (° C.) | 110 | 110 | 140 | 140 | |
| Final product: | | | | | |
| Chlorine content (percent) | 40 | 36 | 40 | 35 | 35 |
| Melting point (° C.), DSC method ¹ | 118 | 118 | | 68 | 128 |
| Heat of fusion of crystalline portion (m cal./mg.) DSC method ¹ | 4 | 8 | 0 | 0–1 | 18 |
| Tensile strength (kg./c.m.²), JIS K6760–1966 ² | 128 | 99 | 103 | 85 | 94 |
| 100% modulus (kg./c.m.²)³ | 10 | 21 | 8 | 16 | 52 |
| 200% modulus (kg./cm.²)³ | 13 | 29 | 9 | 21 | |
| Elongation at breaking point (percent,) JIS K6760–1966 ² | 650 | 440 | 680 | 600 | 203 |
| Hardness (Shore A), at 20° C | 56 | 68 | 55 | 65 | 87 |
| Permanent elongation (percent), JIS K6301–1969, at 29° C | 20 | 22 | 23 | 42 | |

¹ Measured with differential scanning calorimeter (Model DSC–1B) manufactured by Perkin Elmer Co., at the rate of temperature rise of 10° C./min.
² JIS No. 2 Dumbbell was used, at a pull rate of 200 mm./min., at 20° C.
³ Measured simultaneously with the measurement of tensile strength.
⁴ Ziegler process.

TABLE 3
Blend for electric wire coating

| Chlorinated polyethylene | 1 | 2 | A | B |
|---|---|---|---|---|
| Tensile strength (kg./cm.²), JIS K6760-1966 [1] | 99(87) | 111(53) | 92(41) | [4]64(—) |
| 100% modulus (kg./cm.²) [2] | 13(69) | 29(28) | 15(13) | [4]16(—) |
| Elongation at breaking point (percent), JIS K6760-1966 [1] | 660(112) | 380(155) | 550(118) | [4]870(—) |
| Hardness (Shore A) [3] | 60(63) | 72(53) | 63(46) | [4]67(—) |
| Permanent elongation (percent JIS K6301-1969 [3] | 46(135) | 31(119) | 42(121) | [4]195(—) |

[1] JIS No. 2 Dumbbell was used at a pull rate of 200 mm./min., at 20° C.
[2] Measured simultaneously with tensile strength.
[3] Measured at 20° C.
[4] Measuring impossible due to degradation.
NOTE.—The values in the parentheses are the retention (percent) of properties after 18 hours' immersion in 70° C. oil of JIS K6301-1969, No. 2.

EXAMPLES 3–6

Example 1 was repeated with the following variations that as the suspension stabilizer, the acrylic acid polymer was replaced by copolymer of maleic anhydride with methyl vinyl ether of an inherent viscosity (1% MEK solution, 25° C.) 3.0, softening point 210° C., pH of 5% aqueous solution 2.0; that 140 g. each of the stabilizer was added to the system before initiation of the reaction and before the heat-treatment; and that the employed polyethylenes were those prepared by low pressure process in the presence of Ziegler catalyst, and had viscosity-average molecular weight of 40,000, with other properties varying in each run as follows:

| Ex. No. | Density | Melt index | Melting temperature range of crystalline portion (° C.) | Melting point (° C.) |
|---|---|---|---|---|
| 3 | 0.945 | 6.0 | 95–127 | 124 |
| 4 | 0.955 | 6.5 | 83–135 | 128 |
| 5 | 0.970 | 5.5 | 116–133 | 133 |

As demonstrated in Table 4, the polyethylenes were chlorinated to chlorine content of 28 wt. percent at 110° C., heat-treated at 140° C., and further chlorinated to chlorine content of 35 wt. percent at 110° C. Polyethylenes of lower melting point gave softer chlorinated polyethylene of greater elongation. In Examples 3–5, the increase in chlorine content due to the heat treatment was not more than 0.5 wt. percent in all runs.

The same starting polyethylene as employed in Example 4 was similarly chlorinated in Example 6, but due to the omission of unreacted chlorine-expelling step with nitrogen gas before the heat-treatment, the increase in chlorine content of first-stage-chlorinated polyethylene due to the heat treatment was 2.1 wt. percent.

TABLE 4

| Chlorinated polyethylene | 3 | 4 | 5 | 6 |
|---|---|---|---|---|
| Starting polyethylene: | | | | |
| Type | Zieglar process | | | |
| Density (g./cm.³), JIS K6760-1966 | 0.945 | 0.955 | 0.970 | 0.955 |
| Melt index (g./10 min.) JIS K6760-1966 | 6.0 | 6.5 | 5.5 | 6.5 |
| Melting point (° C.), DSC method [1] | 124 | 128 | 133 | 128 |
| Heat of fusion of crystalline portion (m. cal./mg.), DSC method [1] | 58 | 71 | 78 | 71 |
| First stage chlorination: Temperature (° C.) | 110 | 110 | 110 | 110 |
| After first stage chlorination: | | | | |
| Chlorine content percent | 28 | 28 | 28 | 28 |
| Melting point (° C.), DSC method [1] | 121 | 125 | 127 | 125 |
| Heat of fusion of crystalline portion (m./cal./mg.), DSC method [1] | 25 | 33 | 38 | 34 |
| Heat treatment: | | | | |
| Temperature (° C.) | 140 | 140 | 140 | 140 |
| Time (minutes) | 120 | 120 | 120 | 120 |
| After heat-treatment: | | | | |
| Melting point (° C.), DSC method | 115 | 116 | 120 | 114 |
| Heat of fusion of crystalline portion (m cal./mg.) DSC method [1] | 11 | 17 | 20 | 14 |
| Second stage chlorination: Temperature (° C.) | 110 | 110 | 110 | 110 |
| Final product: | | | | |
| Chlorine content (percent) | 34 | 35 | 35 | 35 |
| Melting point (° C.), DSC method [1] | 115 | 116 | 122 | 115 |
| Heat of fusion of crystalline portion (m cal./mg.) DSC method [1] | 3 | 7 | 13 | 2 |
| Tensile strength (kg./cm.²), JIS K6760-1966 [2] | 85 | 125 | 139 | 98 |
| 100% modulus (kg./cm.²) [3] | 11 | 15 | 58 | 11 |
| 200% modulus (kg./cm.²) [3] | 12 | 17 | 66 | 13 |
| Elongation at breaking point (percent), JIS K6760-1966 [2] | 1,040 | 780 | 580 | 820 |
| Hardness (Shore A), at 20° C | 67 | 78 | 91 | 73 |
| Permanent elongation (percent), JIS K6301-1969), at 20° C | | | | |

See footnotes 1, 2 and 3, Table 1.

EXAMPLE 7 AND CONTROL D

Chlorination reactions were performed similarly to Example 1 and Controls A, B, and C, except that the starting polyethylene was same to that used in Example 3, i.e. polyethylene of a density 0.945, melt index 6.0, melting temperature range of crystalline portion 95–127° C., melting point 124° C., and a viscosity-average molecular weight 40,000, as shown in Table 5 below. Example 7 is an embodiment of the present invention characterized by the intervening heat-treatment, while in Control D, the step (b) was entirely omitted and all the chlorination was performed by single stage at a temperature below the melting point of starting polyethylene. As clearly demonstrated in Table 5, 100% modulus is remarkably improved in the chlorinated polyethylene made by the present process, compared with the known single stage chlorination product, and therefore provides sufficiently soft product nevertheless showing sufficient tensile strength. Such chlorinated polyethylene having high tensile strength and low modulus is convenient as the material of artificial leather, either by itself or used concurrently with other resins such as polyvinyl chloride.

TABLE 5

| Chlorinated polyethylene | 7 | D |
|---|---|---|
| Starting polyethylene: | | |
| Type | Ziegler process | |
| Density (g./cm.³), JIS K6760-1966 | 0.945 | 0.945 |
| Melt index (g./10 min.) JIS K6760-1966 | 6.0 | 6.0 |
| Melting point (° C.), DSC method [1] | 124 | 124 |
| Heat of fusion of crystalline portion (m cal./mg.), DSC method [1] | 58 | 58 |
| First stage chlorination: Temperature (° C.) | 100 | 117 |
| After first stage chlorination: | | |
| Chlorine content (percent) | 27 | |
| Melting point (° C.), DSC method [1] | | |
| Heat of fusion of crystalline portion (m cal./mg.), DSC method [1] | | |
| Heat treatment: | | |
| Temperature (° C.) | 130 | |
| Time (minutes) | 120 | |
| After heat treatment: | | |
| Melting point (° C.) DSC method [1] | | |
| Heat of fusion of crystalline portion (m cal./mg.) DSC method [1] | | |
| Second stage chlorination: Temperature (° C.) | 100 | |
| Final product: | | |
| Chlorine content (percent) | 46 | 46 |
| Melting point (° C.) DSC method [1] | 112 | 127 |
| Heat of fusion of crystalline portion (m cal./mg.) DSC method [1] | 4 | 6 |
| Tensile strength (kg./cm.²), JIS K6760-1966 [2] | 177 | 175 |
| 100% modulus (kg./cm.²) [3] | 90 | 120 |
| Elongation at breaking point (percent) JIS K6760-1966 [2] | 350 | 320 |
| Hardness (Shore D, at 20° C.) | 66 | 70 |

See footnotes 1, 2 and 3, Table 1.

EXAMPLE 8 AND CONTROLS E, F, AND G

A glass container of 3 liters in capacity was charged with 200 g. of polyethylene powder prepared by high pressure process, which passed through wire gauge of 35 mesh, and had a density of 0.920, melt index of 0.3, melting temperature range of crystalline portion of 87°–115° C., and a melting point of 112° C.; 0.1 g. of a wetting agent composed chiefly of a block copolymer of polyethylene oxide and polypropylene oxide; 2 liters of deionized water, and 5.5 g. of homopolymer of acrylic acid amide of approximately 1,000,000 in viscosity-average molecular weight, and 8% solid component, as a suspension stabilizer. While irradiating the system externally with 20 W daylight luminescent lamp, chlorine gas was blown into the reactor at a rate of approximately 1.55 g./min. at the temperatures specified in Table 6. In Controls E and F, chlorination was continued at respectively 87° C. and 97° C., until the chlorine contents reached 34% by weight. In Example 8, the chlorine introduction was interrupted when the chlorine content reached 27% by weight, and the system was stirred for a while as it was, until the reaction liquid become colorless and the yellow color indicating the presence of unreacted chlorine disappeared. Then the system was heated to 100° C., and heat-treated for 120 minutes at said temperature. The second stage chlorination was performed at 87° C., to a chlorine content of 33% by weight. Whereas, in Control G, the polyethylene was chlorinated to a chlorine content of 34% by weight under identical conditions with those of Control E. Then the chlorine introduction was stopped, and the chlorinated polyethylene was heat-treated at 100° C. for 120 minutes. In this control the second stage chlorination was omitted. The melting point of remaining crystalline portion rose to 104° C., and the heat of fusion of said crystalline portion was reduced to 11 m cal./mg.

The properties of the resulting chlorinated polyethylenes were as shown in Table 6 below.

TABLE 6

| Chlorinated polyethylene | 8 | E | F | G |
|---|---|---|---|---|
| Starting polyethylene: | | | | |
| Type | [4] | | | |
| Density (g./cm.³), JIS K6760-1966 | 0.923 | | | |
| Melt index (g./10 min.) JIS K6760-1966 | 0.3 | 0.3 | 0.3 | 0.3 |
| Melting point (° C.), DSC method [1] | 112 | | | |
| Heat of fusion of crystalline portion (m cal./mg.), DSC method [1] | 44 | | | |
| First stage chlorination: Temperature (° C.) | 87 | 87 | 97 | 87 |
| After first stage chlorination: | | | | |
| Chlorine content (percent) | 27 | | | 34 |
| Melting point (° C.), DSC method [1] | 98 | | | 98 |
| Heat fusion of crystalline portion (m cal./mg.), DSC method [1] | 18 | | | 15 |
| Heat treatment: | | | | |
| Temperature (° C.) | 100 | | | 100 |
| Time (minutes) | 120 | | | 120 |
| After heat-treatment: | | | | |
| Melting point (° C.), DSC method [1] | 105 | | | 105 |
| Heat of fusion of crystalline portion (m cal./mg.) DSC method [1] | 12 | | | 11 |
| Second stage chlorination: temperature (° C.) | 87 | | | |
| Final product: | | | | |
| Chlorine content (percent) | 33 | 34 | 34 | 34 |
| Melting point (° C.), DSC method [1] | 106 | 99 | 104 | 104 |
| Heat of fusion of crystalline portion (m cal./mg.) DSC method [1] | 10 | 16 | 3 | 11 |
| Tensile strength (kg./cm.²), JIS K6760-1966 [2] | 88 | 148 | 41 | 152 |
| 100% modulus (kg./cm.²) [3] | 33 | | | |
| 200% modulus (kg./cm.²) [3] | 46 | 83 | 17 | 78 |
| Elongation at breaking point (percent), JIS K6760-1966 [2] | 560 | 380 | 720 | 410 |
| Hardness (Shore A), at 20° C | 73 | 81 | 70 | 80 |

See footnotes 1, 2, and 3, Table 1.
[4] High pressure process.

Ten (10) parts each of the chlorinated polyethylenes prepared in the above Control E, Examples 8, 2, 3, 4, and 5, and Controls B and C were used for making plural blends as follows: 10 parts of one of the polyethylenes, 90 parts of polyvinyl chloride of an average degree of polymerization 1050 which was prepared by suspension polymerization, 1.5 parts of cadmium stearate, 1.5 parts of barium stearate, and 2.0 parts of epoxidated soybean oil were milled for 5 minutes with twin roll of 175° C., and hot-pressed at 180° C. for 10 minutes under a pressure of 100 kg./cm.², to be formed into a sheet of 1 mm. in thickness. The properties of the blends were measured as to the test pieces, with the results as given in Table 7.

TABLE 7

| Chlorinated polyethylene | PVC[1] | 2 | B | C | 3 | 4 | 5 | 8 | E |
|---|---|---|---|---|---|---|---|---|---|
| Tensile strength, (kg./cm.²)[2] | 522 | 439 | 420 | 482 | 445 | 465 | 445 | 447 | 455 |
| Elongation at breaking point (percent)[2] | 140 | 145 | 150 | 140 | 175 | 160 | 120 | 145 | 135 |
| Hardness (Shore D)[2] | 76 | 74 | 72 | 75 | 75 | 75 | 74 | 74 | 75 |
| Transparency (percent)[3] | 100 | 40 | 15 | 63 | 25 | 51 | 70 | 69 | 71 |
| Impact strength (kg.-cm.)[4] | 7 | 49 | 48 | 12 | 47 | 45 | 28 | 28 | 15 |
| Surface condition during roll-milling[5] | Good | (6) | (7) | (6) | Good | Good | Good | (6) | (6) |

[1] No chlorinated polyethylene was added.
[2] JIS K6745-1963, at 20° C.
[3] Percent transmittancy with that of polyvinyl chloride is set to be 100. Each 1-mm. thick polyvinyl chloride sheet and test sheet were let stand in cells filled with water, and the amount of transmittance of red and blue lights from photoelectric tubes in the absence of filter was measured by Corolimeter (tradename, manufactured by Shimazu Seisakujo, K.K.) The measured value of the test sheet was divided by that of the polyvinyl chloride sheet, and multiplied by 100.
[4] Measured with Du Pont type impact tester: load 1 kg.; diameters of the pedestal and the hemispherical head of hammer each 6 mm.; the values were calculated from the height at which 50% of specimen explode at 0° C.
[5] Graded with naked eye.
[6] Satisfactory.
[7] Acceptable.

EXAMPLE 9

The same starting polyethylene as employed in Example 1 was chlorinated under same conditions except that the reaction temperature was 125° C. to a chlorine content of 20% by weight. Then the chlorine introduction was interrupted, and the system was cooled to 90° C. The unreacted chlorine was expelled with nitrogen gas, and the chlorinated polyethylene was heat-treated at 140° C. for 30 minutes, after addition of 105 g. of the suspension stabilizer, cooled to 110° C., further chlorinated to a chlorine content of 31% by weight, and once more the unreacted chlorine was expelled, followed by another heat-treatment at 140° C. for 30 minutes. Finally the reaction product was cooled to 105° C. and chlorinated to a chlorine content of 41 wt. percent. Upon washing and drying the product similarly to Example 1, chlorinated polyethylene containing no crystalline portion was obtained, which was completely soluble in benzene at room temperature. After the oil immersion test, it exhibited substantially the same properties as those of the product of Example 1, inclusive of the percent retention after the test, except that the former's tensile strength was less than that of the latter by 17 kg./cm.², and the elongation at breaking point was greater by 70%.

EXAMPLE 10 AND CONTROL H

Chlorination of polyethylene was started at 110° C. similarly to Example 1, except that the starting polyethylene was same to that employed in Example 4, and 200 g. of aqueous solution of sodium salt of acrylic acid polymer of pH 9.0 and solid component 12.5% was used as the suspension stabilizer. The reaction was interrupted when the chlorine content of the polyethylene reached 41 wt. percent in Example 10, and 40 wt. percent in Control H, and after removal of unreacted chlorine, 200 g. of the same suspension stabilizer was added to each system. In Example 10, the chlorinated polyethylene was heat-treated at 140° C. for 60 minutes, cooled to 130° C., and further chlorinated to a chlorine content of 47 wt. percent. In Control H, the chlorinated polyethylene was further chlorinated at 130° C. to a chlorine content of 48 wt. percent, without the intervening heat-treatment. Upon washing and drying the products similarly to Example 1, in both runs white powder of particle diameters 0.5–1 mm. was obtained. No peak indicating the presence of residual crystalline portions was detected in both products by DSC method, but the product of Example 10 was completely soluble in toluene at room temperature, while that of Control H was incompletely soluble.

We claim:
1. A process for the preparation of chlorinated polyethylene by multi-stage chlorination of polyethylene in an aqueous suspension system, which comprises:
   (a) chlorinating polyethylene powder in a first stage chlorination at a temperature 5–50° C. below the crystal melting point of said polyethylene, under introduction of chlorine, to a chlorine content of from 10–45% by weight, in a manner so as to avoid complete melting and disappearance of the crystalline portion of said polyethylene,
   (b) heat-treating the first stage-chlorinated polyethylene under interruption of chlorine introduction, at a temperature ($T_b$) above the lower critical melting temperature of the crystalline portion of the first stage-chlorinated polyethylene and at least 5° C. above the first stage-chlorination temperature, the heat treatment being carried out so that the chlorine content after heat treatment and before further chlorination is less than 1% higher than the chlorine content after chlorination step (a); and
   (c) thereafter further chlorinating the heat-treated chlorinated polyethylene under resumption of chlorine introduction in a second stage chlorination, at a temperature ($T_c$) below heat-treating temperature ($T_b$) and 10–60° C. lower than the crystal melting point of the starting polyethylene, until a final chlorine content of 20–55% by weight is reached, said final chlorine content being at least 1% by weight higher than the chlorine content after chlorination step (a).
2. The process of claim 1 wherein a suspension stabilizer selected from the group consisting of:
   (i) a water-soluble polymer or copolymer of which at least 50 mol percent is composed of a monomer selected from the group consisting of acrylic acid and methacrylic acid; water-soluble, partially esterified product of the foregoing in which a part of carboxylate radicals is esterified; and water-soluble salts thereof;
   (ii) a water-soluble polymer or copolymer of which at least 50 mol percent is composed of a monomer selected from the group consisting of acrylamide and methacrylamide;
   (iii) a water-soluble polymer or copolymer of which at least 50 mol percent is composed of maleic acid; water-soluble, partially esterified product thereof in which a part of carboxylate radicals is esterified; water-soluble salts thereof; and
   (iv) a water-soluble polymer or copolymer of which at least 50 mol percent is composed of vinyl pyrrolidones, is present in the system in an amount of less than 10% by weight based on the weight of the starting polyethylene.

3. The process of claim 1 wherein the temperature of heat treatment is at least 10° C. above the first stage chlorination temperature.

4. The process of claim 1 wherein the average particle diameter of starting polyethylene is not more than 1 mm.

5. The process of claim 4, wherein the starting polyethylene, is a polymer of which at least 90 mol percent is composed of ethylene, and has a density of at least 0.940, and viscosity-average molecular weight of at least 10,000.

6. The process of claim 4, wherein the starting polyethylene has a density of less than 0.940 and the upper critical melting temperature (T) of its crystalline portion exceeds 90° C.

7. The process of claim 1 wherein after the second stage chlorination of step (c), the heat-treating step (b) is again effected at a temperature ($T_b'$) exceeding the lower critical melting temperature of the crystalline portion of the second stage-chlorinated polyethylene and the second stage chlorination temperature ($T_c$); thereafter the product is further chlorinated at a temperature ($T_c'$) below the temperature ($T_b'$), and such repetition of steps (b)–(c) are performed by the desired number of cycles, the ultimately intended chlorine content of the product being reached by the end of step (c) of the last cycle.

8. The process of claim 7, wherein a suspension stabilizer selected from the group consisting of:

(i) a water-soluble polymer or copolymer of which at least 50 mol percent is composed of a monomer selected from the group consisting of acrylic acid and methacrylic acid; water-soluble, partially esterified product of the foregoing in which a part of carboxylate radicals is esterified; and water-soluble salts thereof;

(ii) a water-soluble polymer or copolymer of which at least 50 mol percent is composed of a monomer selected from the group consisting of acrylamide and methacrylamide;

(iii) a water-soluble polymer or copolymer of which at least 50 mol percent is composed of maleic acid; water-soluble, partially esterified product thereof in which a part of carboxylate radicals is esterified; water-soluble salts thereof; and (iv) a water-soluble polymer or copolymer of which at least 50 mol percent is composed of vinyl pyrrolidones, is present in the system in an amount of less than 10% by weight, based on the weight of the starting polyethylene.

References Cited
UNITED STATES PATENTS

| | | | |
|---|---|---|---|
| 3,227,781 | 1/1966 | Klug et al. | 260—94.9 |
| 3,454,544 | 7/1969 | Young et al. | 260—94.9 |

FOREIGN PATENTS 729,282   3/1966   Canada.

JOSEPH L. SCHOFER, Primary Examiner

E. J. SMITH, Assistant Examiner

U.S. Cl. X.R.

260—889, 897 A, 897 C